United States Patent
Meier

(10) Patent No.: US 7,634,854 B2
(45) Date of Patent: Dec. 22, 2009

(54) METHOD FOR JOINING BLADES TO BLADE ROOTS OR ROTOR DISKS WHEN MANUFACTURING AND/OR REPAIRING GAS TURBINE BLADES OR INTEGRALLY BLADED GAS TURBINE ROTORS

(75) Inventor: Reinhold Meier, Dorfen (DE)

(73) Assignee: MTU Aero Engines GmbH, Munich (DE)

( * ) Notice: Subject to any disclaimer, the term of this patent is extended or adjusted under 35 U.S.C. 154(b) by 546 days.

(21) Appl. No.: 10/570,418

(22) PCT Filed: Jun. 30, 2005

(86) PCT No.: PCT/DE2005/001150

§ 371 (c)(1),
(2), (4) Date: Mar. 2, 2006

(87) PCT Pub. No.: WO2006/005296

PCT Pub. Date: Jan. 19, 2006

(65) Prior Publication Data

US 2008/0244905 A1 Oct. 9, 2008

(30) Foreign Application Priority Data

Jul. 8, 2004 (DE) .................. 10 2004 032 975

(51) Int. Cl.
*B23P 6/00* (2006.01)
*B23P 19/04* (2006.01)
(52) U.S. Cl. .................. 29/889.1; 29/889.21; 29/889.7; 29/402.07
(58) Field of Classification Search ................ 29/889.1, 29/889.2, 889.21, 402.06, 402.07, 402.16, 29/889.7; 416/213 R; 219/121.64
See application file for complete search history.

(56) References Cited

U.S. PATENT DOCUMENTS 2,637,521 A * 5/1953 Constantine et al. ..... 416/244 R
2,778,095 A * 1/1957 Schorner ................. 29/889.21
3,003,745 A 10/1961 Ferguson et al. .............. 253/77

(Continued)

FOREIGN PATENT DOCUMENTS

CH          310 029        12/1955

OTHER PUBLICATIONS

Karl-Hermann Richter, Sven Orban, Steffen Nowotny, "Laser cladding of the titanium alloy TI6242 to restore damaged blades", Proceedings of the 23$^{rd}$ International Congress on Applications of Lasers and Electro-Optics 2004, Oct. 7, 2004, XP002360040, ICALEO 2004, available at http://www.mtu.de/channel/files/pdf/laser_cladding_of_the_titanium_alloy.pdf.

(Continued)

*Primary Examiner*—David P Bryant
*Assistant Examiner*—Ryan J Walters
(74) *Attorney, Agent, or Firm*—Davidson, Davidson & Kappel, LLC

(57) ABSTRACT

A method is provided for joining blades to blade roots or rotor disks when manufacturing and/or repairing gas turbine blades or integrally bladed gas turbine rotors. A blade and a blade root or rotor disk that is to be joined to the blade are supplied, and provided with a thickening in sections that are to be joined together. The sections of the blade and the blade root or rotor disk that are to be joined together are machined so as to form recesses and; c) are then aligned relative to each other, opposite recesses defining at least one groove-shaped seam preparation. The blade and the blade root or rotor disk are joined in the area of the or each seam preparation by means of laser power build-up welding and the joined blade and blade root or rotor disk are machined so as to provide a gas turbine blade or an integrally bladed gas turbine rotor having a predefined geometrical profile.

12 Claims, 6 Drawing Sheets

U.S. PATENT DOCUMENTS

| | | | | |
|---|---|---|---|---|
| 4,896,814 | A | * | 1/1990 | Allain et al. .............. 228/119 |
| 5,511,949 | A | | 4/1996 | Thore .................... 416/213 |
| 6,991,150 | B2 | * | 1/2006 | Sato et al. ................ 228/119 |
| 2006/0248718 | A1 | * | 11/2006 | Szela et al. ............... 29/889.1 |

OTHER PUBLICATIONS

Bernd Stimper, "Lasereinsatz zum Generieren und Reparieren in der Triebwerkteileinstandsetzung", OTTI Profiforum—Lasereinsatz in der Fertigung und Materialbearbeitung—Regensburg, Sep. 30, 2003, XP002360041, available at: http://www.mtu.de/channel/files/pdf/3272Stimper.pdf See Search Report of PCT/DE2005/0011550 In English.

* cited by examiner

METHOD FOR JOINING BLADES TO BLADE ROOTS OR ROTOR DISKS WHEN MANUFACTURING AND/OR REPAIRING GAS TURBINE BLADES OR INTEGRALLY BLADED GAS TURBINE ROTORS

FIELD OF THE INVENTION

The present invention relates to a method for joining blades to blade roots or rotor disks when manufacturing and/or repairing gas turbine blades or integrally bladed gas turbine rotors.

BACKGROUND

Gas turbines, such as aircraft engines, for example, have at least one compressor, as well as at least one turbine, the or each compressor, as well as the or each turbine having at least one stage, and the or each stage of each compressor, as well as of each turbine being constituted of a stationary guide vane ring, as well as of a rotating rotor blade ring. The rotor blades forming the or each rotating rotor blade ring each have an aerodynamically shaped blade, the blade of each rotor blade either being anchored by a blade root in corresponding recesses of a rotor disk, or being permanently joined to the rotor disk, forming an integrally bladed gas turbine rotor. Integrally bladed gas turbine rotors are also referred to as blisks (bladed disks) or blings (bladed rings).

The rotor blades of a gas turbine, in particular, are exposed to heavily oxidizing, corroding or also eroding conditions during operation of the gas turbine, so that they are subjected to substantial wear. Thus, the need may arise, for example, when working with integrally bladed rotors, to replace a damaged blade in order to repair the integrally bladed gas turbine rotor. This then requires joining a new blade to the rotor disk of the gas turbine rotor at the location where a damaged blade had been removed. When rebuilding integrally bladed gas turbine rotors, all of the blades must be joined to the rotor disk. When individual gas turbine blades are rebuilt, it is necessary to join a blade to a corresponding blade root.

The related art method provides for using linear friction welding or inductive high-frequency pressure welding to join blades to blade roots or rotor disks when manufacturing and/or repairing gas turbine blades or integrally bladed gas turbine rotors. Both linear friction welding, as well as inductive high-frequency pressure welding are costly, particularly when working with high-temperature resistant materials, and they pose risks in terms of process safety.

SUMMARY OF THE INVENTION

Against this background, an object of the present invention is to devise a novel method for joining blades to blade roots or rotor disks when manufacturing and/or repairing gas turbine blades or integrally bladed gas turbine rotors. For ease of reference, the term "blade support" is used herein to mean either a blade root or a rotor disk.

In accordance with an embodiment of the present invention, a method for joining blades to blade roots or rotor disks when manufacturing and/or repairing gas turbine blades or integrally bladed gas turbine rotors includes the steps of: a) prefabricating a blade and a blade root to be joined to the blade, or a rotor disk to be joined to the blade, the blade and the blade root or the rotor disk having a thickened region at portions of the same to be joined; b) machining the portions of the blade and blade support (i.e. the blade root or the rotor disk) to be joined together, to form recesses; c) subsequently mutually aligning the blade and the blade support to be joined to the blade, mutually opposing recesses delimiting at least one groove-shaped weld preparation; d) joining the blade and blade support in the area of the or each weld preparation by employing laser powder build-up welding; e) machining the mutually joined blade and blade support to prepare a gas turbine blade or an integrally bladed gas turbine rotor having a predefined geometric profile. In the case of a method for repairing gas turbine blades or integrally bladed gas turbine rotors, the blade support (i.e., the blade root or rotor disk) may be prefabricated in step (a) by performing laser powder build-up welding to form a thickened region at least in a separating region of a damaged blade, and separating the damaged blade from a gas turbine along the separating region to form the prefabricated blade support having a thickened region.

BRIEF DESCRIPTION OF THE DRAWINGS

The present invention is described in greater detail in the following on the basis of exemplary embodiments, without being limited to such embodiments. Reference is made to the drawings, in which.

DETAILED DESCRIPTION

Figure 1A:
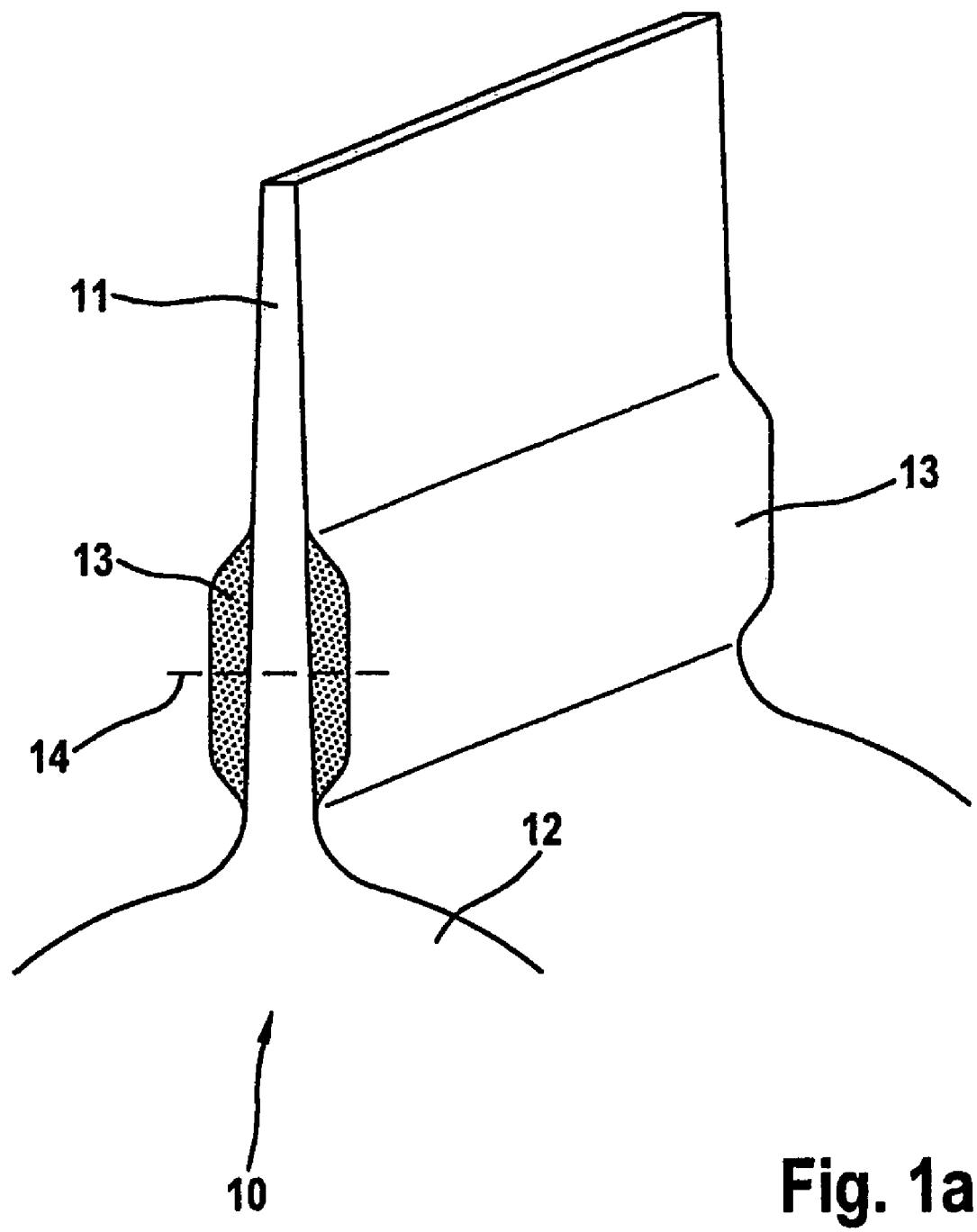
FIG. 1a-1g show, in a highly schematized representation, a rotor disk and a blade in a sequence of method steps for illustrating the method according to the present invention when repairing an integrally bladed gas turbine rotor.
Figure 1B:
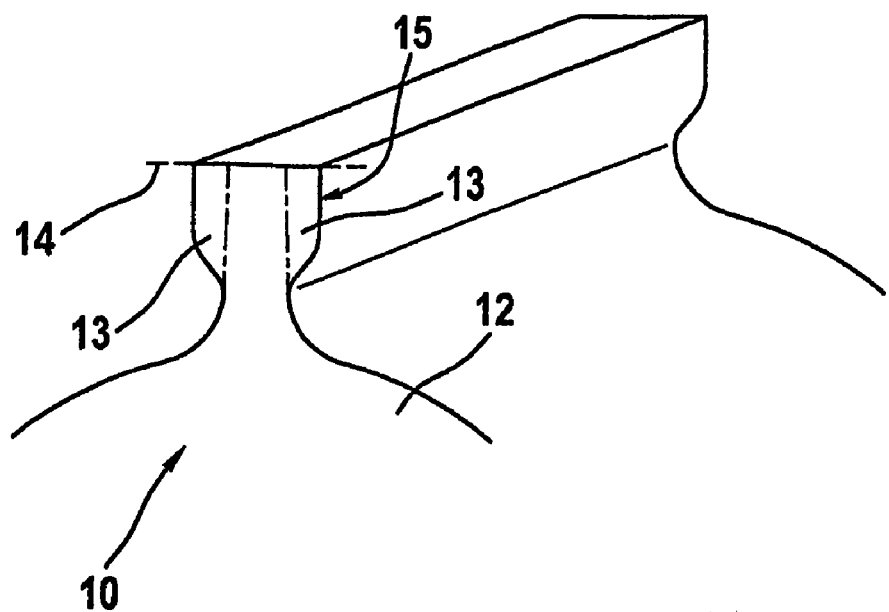
Figure 1C:
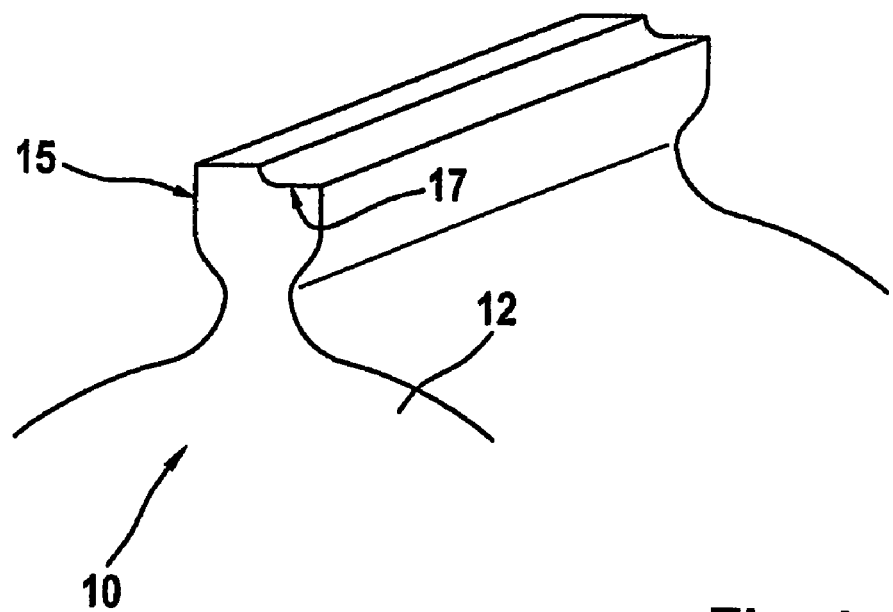

FIG. 1a through 1g clarify one specific embodiment of the method according to the present invention for joining blades to a rotor disk when repairing an integrally bladed gas turbine rotor. In accordance with the method of the present invention, the following procedure is used when repairing an integrally bladed gas turbine rotor:

FIG. 1a shows an integrally bladed gas turbine rotor 10 having a damaged blade 11, the aim being to remove damaged blade 11 from a rotor disk 12 of gas turbine rotor 10 and to replace it with a new blade, in order to repair gas turbine rotor 10 shown in FIG. 1a. Before cutting off damaged blade 11 from rotor disk 12 of integrally bladed gas turbine rotor 10, a thickened region 13 is prepared at least in the area of a later separation site by employing laser powder build-up welding both on the intake side, as well as on the thrust side of blade 11, to ensure a most continuous or uniform possible thickness profile over the entire region of the separation site. Damaged blade 11 is subsequently separated from rotor disk 12 along parting cut 14 shown as a dashed line in FIG. 1a. The separation of damaged blade 11 from rotor disk 12 yields the structure shown in FIG. 1b, thickened region 13 produced beforehand by laser powder build-up welding extending in the area of a portion 15 of rotor disk 12, where a new, prefabricated blade is to be attached in order to repair gas turbine rotor 10.

The thus prepared portion 15 of rotor disk 12, to which a new blade 16 (see FIG. 1d through 1g) is to be attached, is machined along the lines of the present invention in such a way that at least one recess 17 is formed in portion 15. In this connection, in the exemplary embodiment of FIG. 1a through 1g, merely one recess 17 is incorporated in portion 15, this recess 17 extending over the entire axial length of portion 15. This may be inferred, in particular, from FIG. 1c.

Figure 1D:
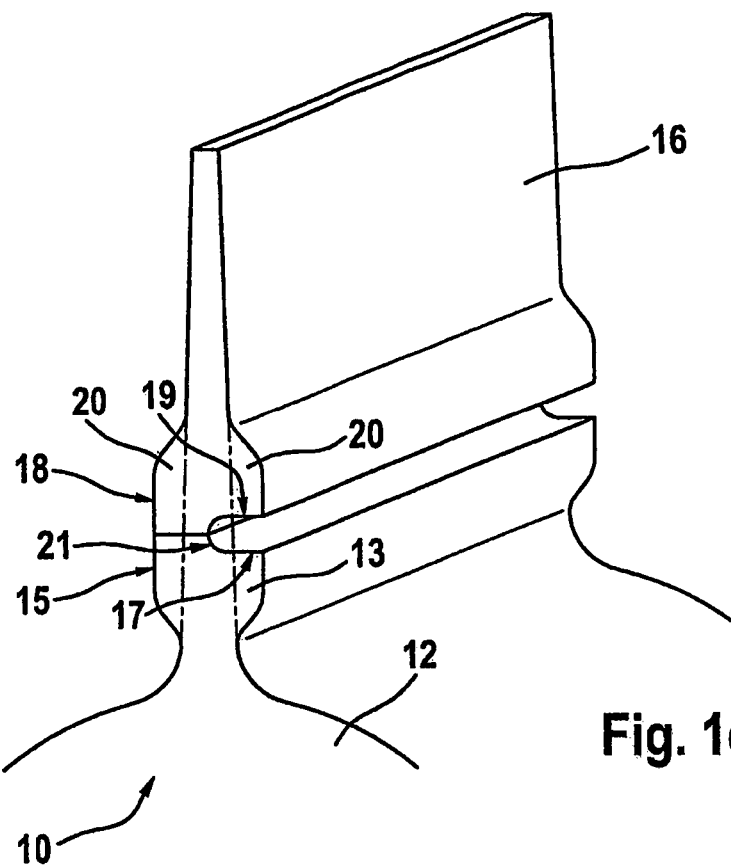

The new, prefabricated blade 16 is likewise provided with a corresponding recess 19 in the area of a portion 18, via which blade 16 is to be attached to portion 15 of rotor disk 12, as may be inferred from FIG. 1*d*, portion 18 of blade 16 also being provided with a corresponding thickened region 20, in order to prepare a continuous or uniform thickness profile on portion 18 of new blade 16. Likewise introduced into blade 16, merely on one side and in the area of portion 18, is a recess 19, which, in turn, extends over the entire axial length of blade 16.

As may be inferred from FIG. 1*d*, rotor disk 12 and new blade 16 are subsequently mutually aligned in a way that permits a positionally correct joining thereof, recesses 17 and 19 of regions 15 and 18 of rotor disk 12 and blade 16 opposing one another and forming a groove-shaped weld preparation 21. Groove-shaped weld preparation 21 extends, in turn, over the entire axial length of blade 16 and rotor disk 12 in the area of portions 15 and 18 to be joined together, and, to be precise, in the exemplary embodiment of FIG. 1*a* through 1*g*, merely on one side of blade 16, this side either being the intake side or the thrust side of blade 16.

Figure 1E:
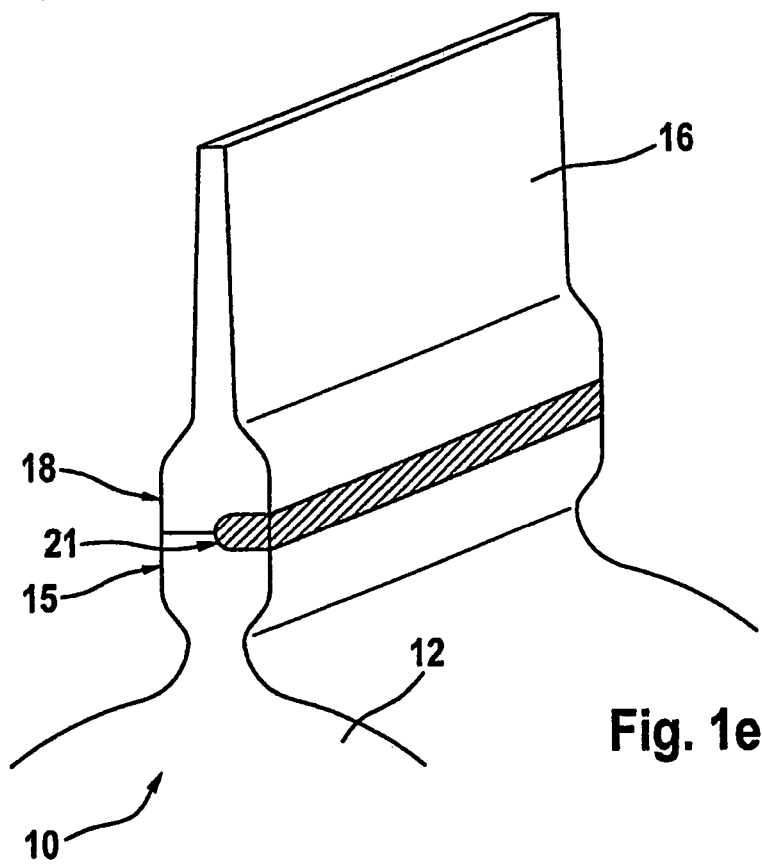
Figure 1F:
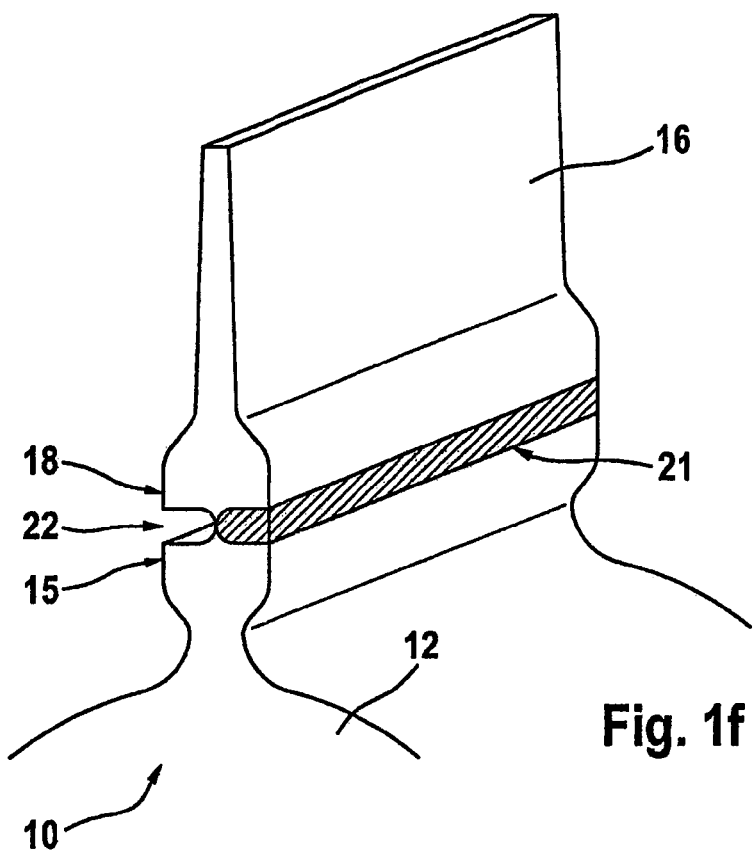

Blade 16, aligned relative to rotor disk 12 along the lines of FIG. 1*d*, is subsequently joined to rotor disk 12 by employing a laser powder build-up welding process in the area of weld preparation 21. Thus, in hatched shading, FIG. 1*e* shows weld preparation 21 filled in by laser powder build-up welding, blade 16 being thereby joined to rotor disk 12 at portions 15 and 18 in the area of weld preparation 21.

In the exemplary embodiment of FIG. 1*a* through 1*g*, another groove-type weld preparation 22 (see FIG. 1*f*) is subsequently introduced to the opposite side of blade 16, where blade 16 is not yet joined to rotor disk 12, and thus on the rear side of weld seam introduced into weld preparation 21. If weld preparation 21, where blade 16 is already joined to rotor disk 12, is located on the thrust side of blade 16, then an additional weld preparation 22 is introduced into the intake side accordingly. In the process, additional weld preparation 22 is introduced into portions 15 and 18 of rotor disk 12 and of blade 16 to be joined together, in such a way that nicks and/or imperfections in the area of a root of the weld seam introduced into weld preparation 21 by laser powder build-up welding are eliminated.

Figure 1G:
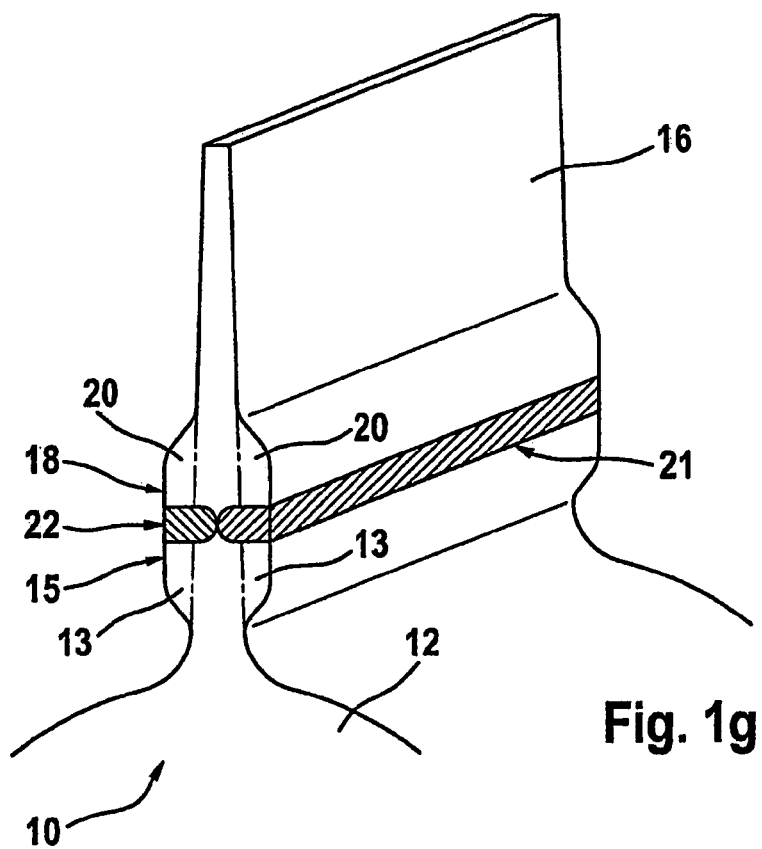

As shown in FIG. 1*g*, a laser powder build-up welding process is subsequently carried out in the region of additional weld preparation 22 and, in this region as well, a weld joint is prepared between blade 16 and rotor disk 12.

Blade 16 joined on both sides to rotor disk 12, as well as rotor disk 12 are subsequently machined in the area of thickened regions 13 and 20, respectively, in such a way that an integrally bladed gas turbine rotor having a predefined, geometric, aerodynamically favorable profile is finally made ready for use. This is preferably accomplished by milling, in particular by adaptive milling. In this context, thickened regions 13 and 20 in the area of mutually joined portions 15 and 18 of rotor disk 12 and of blade 16 are ablated in a way that yields the contour illustrated by a dashed line in FIG. 1*g* in the area of rotor disk 12 and of blade 16. Thickened regions 13 and 20 not only extend in the area of the two sides (intake side and thrust side) of blade 16 and of rotor disk 12, but also in the area of a flow inlet edge and flow outlet edge, so that the material provided by thickened regions 13 and 20, in excess of the dashed-line contour, is removed on all sides.

It should be pointed out here again that, in the exemplary embodiment of FIG. 1*a* through 1*g*, to repair an integrally bladed gas turbine rotor 10, blade 16 and rotor disk 12 are welded in such a way that they are first joined on one side by employing laser powder build-up welding and, on the side that is not yet joined, an additional weld preparation is subsequently formed, where a separate laser powder build-up welding process is then carried out to completely join blade 16 to rotor disk 12. It is also emphasized at this point that, in the context of the present invention, it is understood that the process of joining blade 16 to rotor disk 12 may also be carried out on both sides simultaneously. This then requires introducing corresponding recesses on both sides of portions 15 and 18 of blade 16 and rotor disk 12 to be joined together, so that a positionally correct, mutual alignment of blade 16 and of rotor disk 12 yields groove-type weld preparations on both sides. In this case, blade 16 may be simultaneously welded to rotor disk 12 by laser powder build-up welding.

FIG. 2*a* through 2*d* illustrate a second exemplary embodiment of the method according to the present invention when joining a blade 23 to a blade root 24 in order to manufacture a gas turbine blade 25.

Figure 2A:
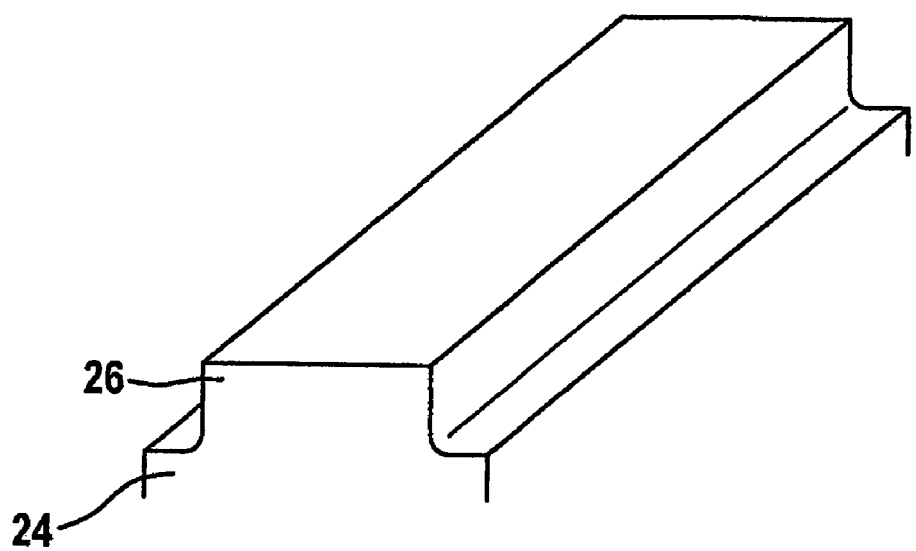
FIG. 2a-2d depict, in a highly schematized representation, a blade root and a blade in a sequence of method steps for illustrating the method according to the present invention when manufacturing a gas turbine blade.
Figure 2B:
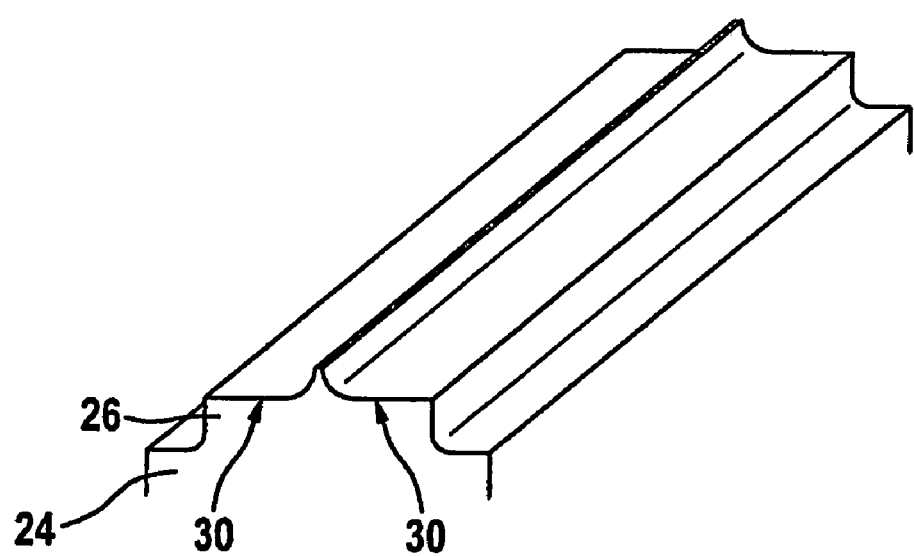
Figure 2C:
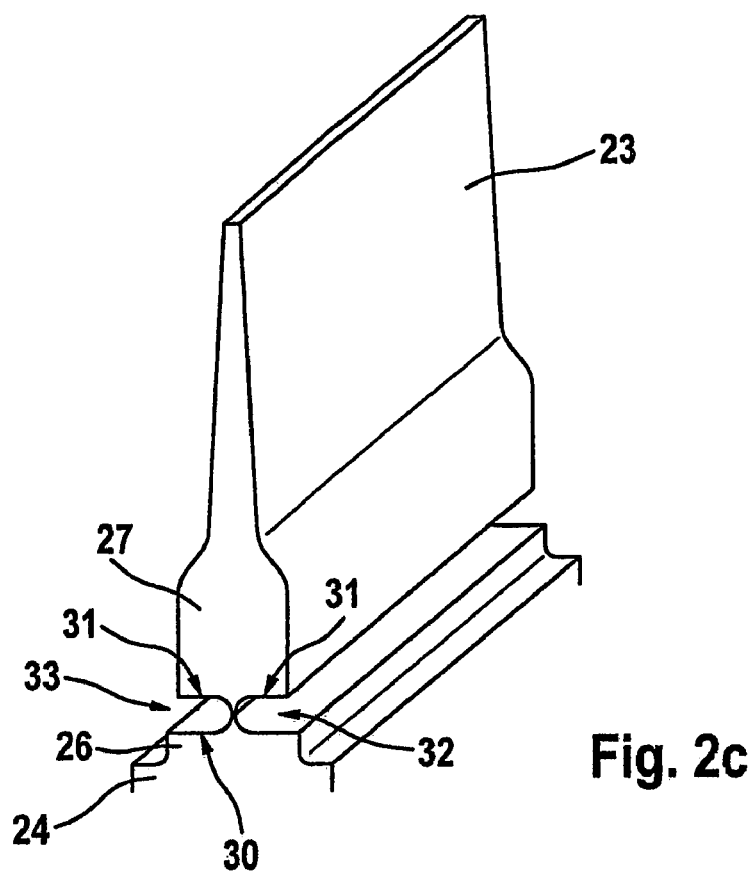

To this end, in accordance with FIG. 2*a*, a blade root 24 is prefabricated, which, at a portion 26, where blade 23 having a portion 27 is to be attached or joined, has a thickened region 28. In the same way, portion 27 of blade 23 has a corresponding thickened region 29. The purpose of thickened regions 28 and 29 is, in turn, to provide a uniform or continuous thickness distribution at portions 28 and 29 of blade 23 and blade root 24 to be joined to one another.

Blade 23, as well as blade root 24 (see, in particular, FIGS. 2*b* and 2*c*), are subsequently machined at portions 26 and 27 in such a way that recesses 30 and, respectively, 31 are produced. In the process, in the exemplary embodiment of FIG. 2*a* through 2*d*, two recesses 30 are introduced in the area of portion 26 of blade root 24, each of these two recesses extending on one side, namely both on the thrust side, as well as on the intake side, over the entire axial length of portion 26. Likewise introduced into portion 27 of blade 23 are two recesses 31, which also extend on both sides of blade 23 over the entire axial length of the same. Once blade 23 and blade 24 are accurately positionally aligned (see FIG. 2*c*), groove-type weld preparations 32 and 33 are formed on both sides, thus both on the thrust side, as well as on the intake side, and extend over the entire axial length thereof. Blade 23 is then joined to blade root 24, simultaneously on both sides of blade 23, by employing laser powder build-up welding in the area of these two groove-type weld preparations 32 and 33. In a hatched shading, FIG. 2*d* shows weld preparations 32 and 33 filled with a weld seam produced by laser powder build-up welding.

Figure 2D:
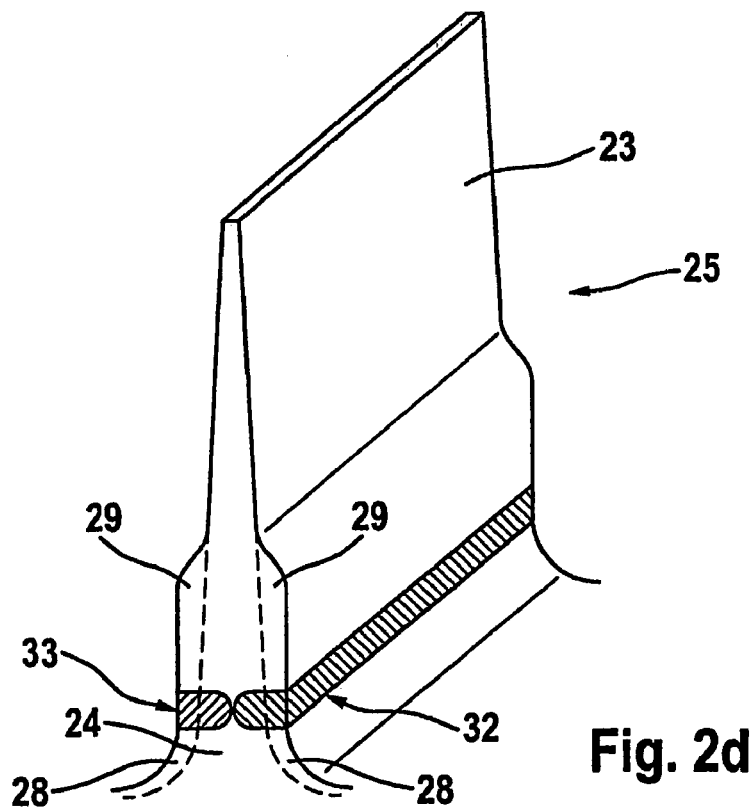

Once blade 23 is joined to blade root 24 in the manner described above, they are then machined in the area of thickened regions 28 and 29 to prepare a gas turbine blade having a predefined geometric profile, as is shown by dashed lines in FIG. 2*d*. This machining operation is preferably accomplished, in turn, by milling, in particular by adaptive milling.

The method according to the present invention makes it possible to produce high-strength bonds between blades and blade roots and, respectively, between blades and rotor disks when manufacturing and/or repairing gas turbine blades or integrally bladed gas turbine rotors. The method according to the present invention is also especially suited when the components to be joined together are manufactured from high-temperature resistant materials.

One skilled in the art whom this technical teaching concerns is already familiar with the details pertaining to laser powder build-up welding, so that no further explanation of this process is needed. It should be merely noted here that, particularly when repairing integrally bladed rotor disks along the lines of the method of the present invention, laser welding heads must be used which permit a beam deflection of up to 90°, since minimal space is available between adjacent blades of an integrally bladed rotor. The laser light, as well as the powdery material required for laser powder build-up welding are externally supplied from the radial direction in this case, and must be deflected in the area of the groove-type weld preparations by up to 90°, to enable the laser light, as well as the powdery material to be introduced into the weld preparations in a manner characterized by positional accuracy.

What is claimed is:

1. A method for joining blades to blade roots or rotor disks when manufacturing and/or repairing gas turbine blades or integrally bladed gas turbine rotors, comprising:
   a) prefabricating a blade and a blade support to be joined to the blade, the blade support being one of a blade root and a rotor disk, the blade having a thickened region at a portion of the blade to be joined to the blade support, the blade support having a thickened region at a portion of the blade support to be joined to the blade;
   b) machining said portion of the blade and said portion of the blade support to form recesses;
   c) subsequently mutually aligning the blade and the blade support to be joined to the blade such that said recesses form mutually opposing recesses delimiting at least one groove-shaped weld preparation;
   d) joining the blade and the blade support in an area of the at least one groove-shaped weld preparation by employing laser powder build-up welding;
   e) machining the joined blade and blade support to form a gas turbine blade or an integrally bladed gas turbine rotor having a predefined geometric profile.

2. The method as recited in claim 1, wherein the recesses extend between a flow inlet edge and a flow outlet edge of the blade and over an entire axial length of the blade.

3. The method as recited in claim 1,
   wherein, after the alignment step, the recesses extend both on an intake side of the blade and a thrust side of the blade, and
   wherein, during the joining step, the laser powder build-up welding is performed simultaneously on the intake side and the thrust side.

4. The method as recited in claim 1,
   wherein, after the alignment step, the recesses extend on only one side of the blade, said one side being either an intake side of the blade or a thrust side of the blade, and
   wherein, during the joining step, the laser powder build-up welding is performed on said one side.

5. The method as recited in claim 4, comprising,
   after the joining step, forming another groove-shaped weld preparation on the other side of the blade such that any nicks and/or imperfections in the area of a root of the weld seam already formed by laser powder build-up welding are removed; and
   subsequently thereto, and before the machining step, performing a laser powder build-up welding process in an area of said another groove-shaped weld preparation on the other side.

6. The method as recited in claim 1, wherein said machining step is performed via a milling process.

7. A method for repairing gas turbine blades or integrally bladed gas turbine rotors, comprising:
   a) performing laser powder build-up welding to form a thickened region at least in a separating region of a damaged blade;
   b) separating the damaged blade from a gas turbine along the separating region to form a blade support, the blade support being one of a blade root and a rotor disk, the blade support having a portion of the thickened region formed in step (a);
   c) prefabricating a replacement blade, the replacement blade having a thickened region at a portion of the replacement blade to be joined to the blade support;
   d) machining said portion of the replacement blade and said portion of the blade support to form recesses;
   e) subsequently mutually aligning the replacement blade and the blade support to be joined to the replacement blade such that said recesses form mutually opposing recesses delimiting at least one groove-shaped weld preparation;
   f) joining the replacement blade and the blade support in an area of the at least one groove-shaped weld preparation by employing laser powder build-up welding;
   g) machining the joined blade and blade support to form a gas turbine blade or an integrally bladed gas turbine rotor having a predefined geometric profile.

8. The method as recited in claim 7, wherein the recesses extend between a flow inlet edge and a flow outlet edge of the replacement blade and over an entire axial length of the replacement blade.

9. The method as recited in claim 7,
   wherein, after the alignment step, the recesses extend both on an intake side of the replacement blade and a thrust side of the replacement blade, and
   wherein, during the joining step, the laser powder build-up welding is performed simultaneously on the intake side and the thrust side.

10. The method as recited in claim 7,
    wherein, after the alignment step, the recesses extend on only one side of the replacement blade, said one side being either an intake side of the replacement blade or a thrust side of the replacement blade, and
    wherein, during the joining step, the laser powder build-up welding is performed on said one side.

11. The method as recited in claim 10, comprising,
    after the joining step, forming another groove-shaped weld preparation on the other side of the replacement blade such that any nicks and/or imperfections in the area of a root of the weld seam already formed by laser powder build-up welding are removed; and
    subsequently thereto, and before the machining step, performing a laser powder build-up welding process in an area of said another groove-shaped weld preparation on the other side.

12. The method as recited in claim 7, wherein said machining step is performed via a milling process.

* * * * *